D. L. EMERSON.
Combined Reel and Rake for Harvesters.
No. 219,236.   Patented Sept. 2, 1879.
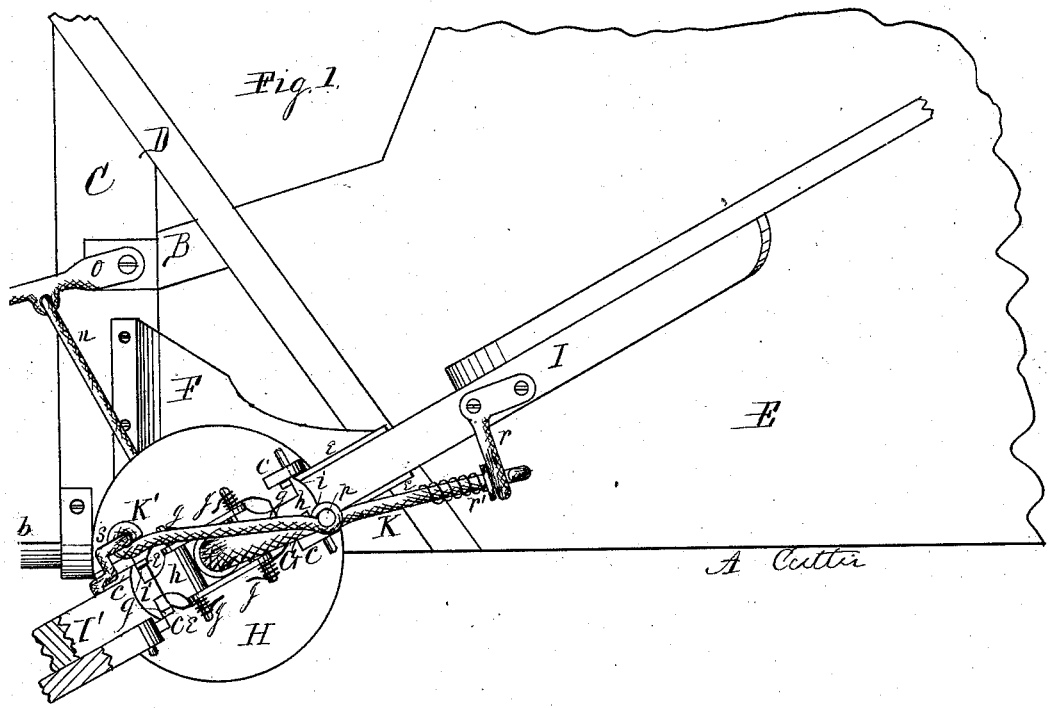
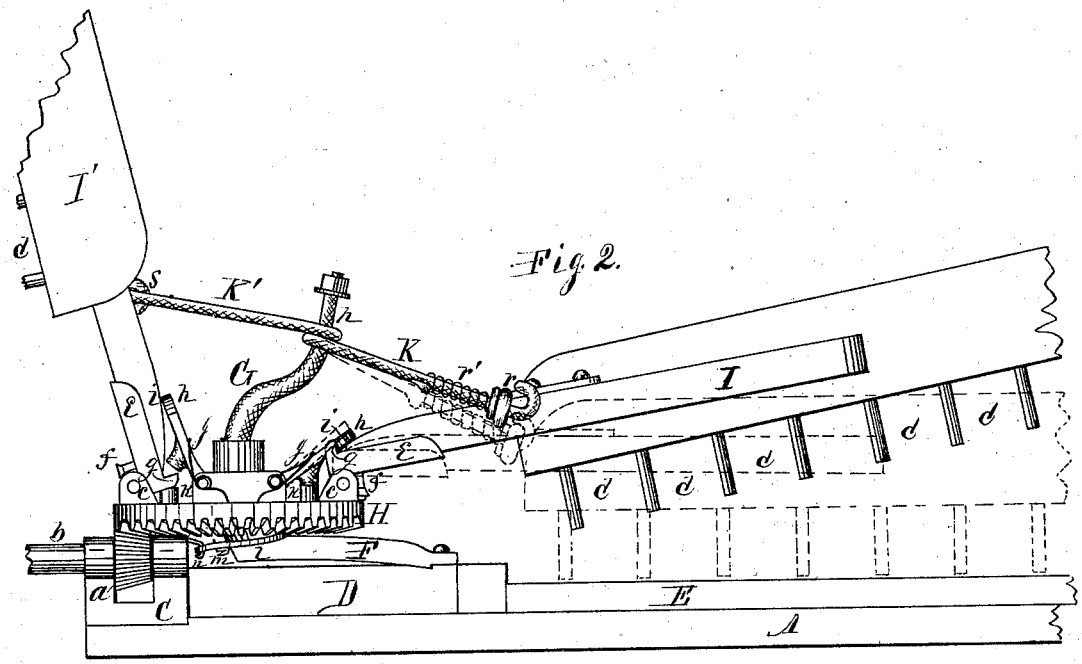
Witnesses.
A. O. Behel
Israel Sovereign
Inventor.
Daniel L. Emerson,
Per Jacob Behel,
Atty.

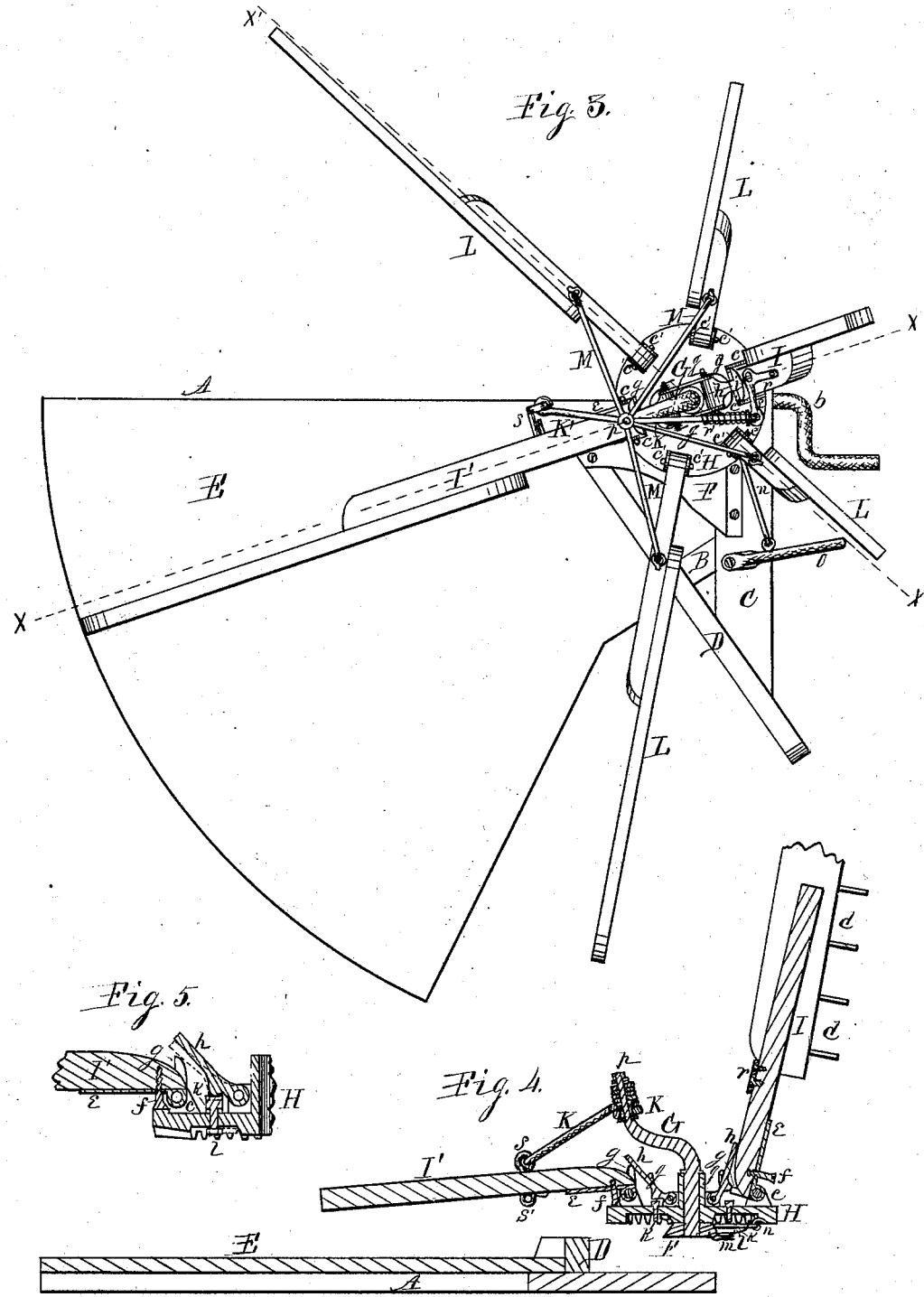

3 Sheets—Sheet 3.
D. L. EMERSON.
Combined Reel and Rake for Harvesters.
No. 219,236. Patented Sept. 2, 1879.
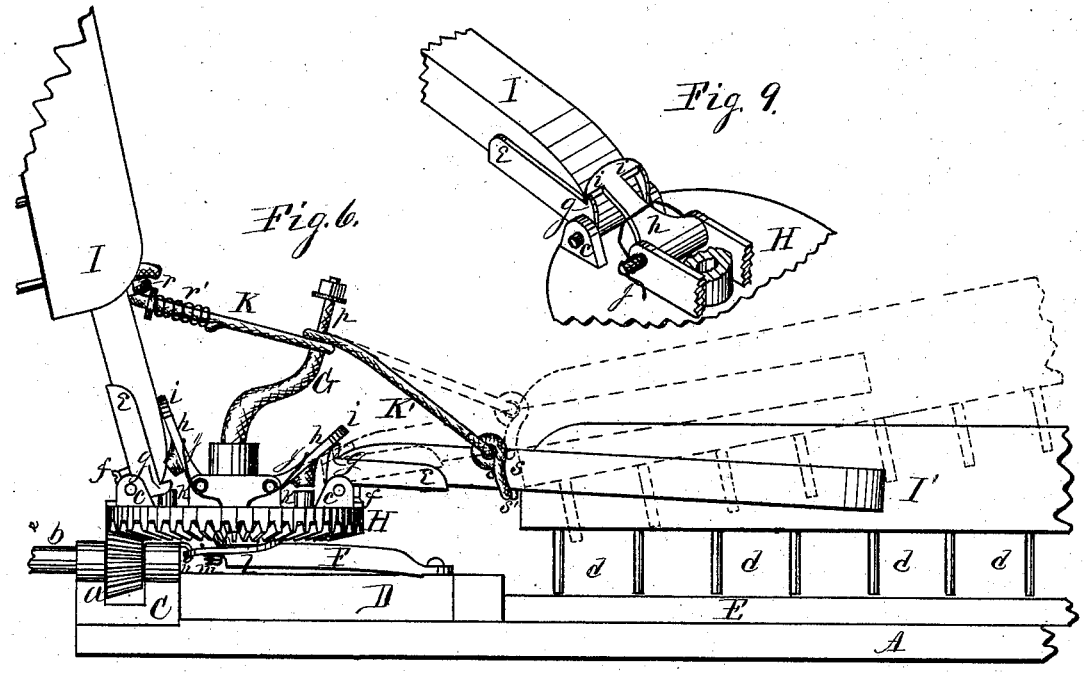
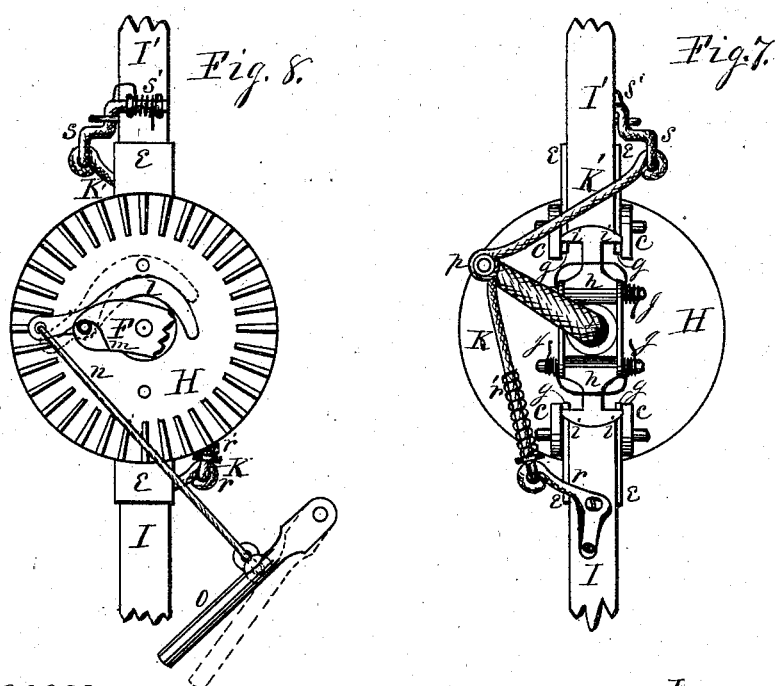

UNITED STATES PATENT OFFICE.

DANIEL L. EMERSON, OF ROCKFORD, ILLINOIS.

IMPROVEMENT IN COMBINED REEL AND RAKE FOR HARVESTERS.

Specification forming part of Letters Patent No. 219,236, dated September 2, 1879; application filed April 26, 1879.

*To all whom it may concern:*

Be it known that I, DANIEL L. EMERSON, of the city of Rockford, in the county of Winnebago and State of Illinois, have invented a new and useful Improvement in Reaping-Machines, of which the following is a specification.

This invention relates to that class of reaping-machines known as "self-raking reapers," in which the rake and reel are combined, operating to gather the grain to the cutters, deposit it on the platform as it is cut, and sweep the cut grain from the platform to deposit it in gavels.

In a combined rake and reel of this class, in which the rake-heads are designed to operate either as a rake or as a reel-bat, it has been customary to construct them in such a manner that while traversing the platform in either capacity they would be held to their distinct or independent lines of travel practically in a rigid manner. This has usually been accomplished by the employment of a cam or cams having trackways provided with a switch or switches operating to change the movements of the rake. Cams for this purpose are necessarily of small diameter, and placed on or near the center of motion of the rake-arms, to operate on their inner end portions near their joint connections with the crown-wheel, which places them at a great disadvantage of leverage with the operating portions of the rake-heads, and must necessarily require cams and the parts in working connection therewith of great strength, which, in connection with their trackways and operating - switches, renders them expensive, and in practice are not entirely reliable, and, in connection with the rigid manner in which they are held by these devices in the track of their pathway in traversing the platform in either capacity, tends to make them still more unreliable.

The object of this invention is to produce a combined rake and reel in which the rake will be capable of use either as a rake or as a reel-bat, and in either capacity will be made to traverse the platform in their respective pathways in a plane substantially parallel thereto, differing only in height, and in either capacity the rake-head will be limited in its descent to the plane of its pathway, but will be flexibly held thereto in such a manner as to permit it to rise above the plane of its pathway to adapt itself to the various conditions of the work, to add to its efficiency, and to render it more durable. These features and others which will be hereinafter explained, and the necessary devices employed to produce these results, and their several combinations, constitute the subject-matter of this specification.

In the accompanying drawings, Figure 1 is a plan view of the main portions of my improved rake mounted on the driving-wheel end of a reaper-frame, and in which two forms of the rake-connections with the rake-post is shown, the preferred form being shown on the patform of this plan. Fig. 2 is a front elevation. Fig. 3 is plan view of my improved rake and reel combined, in which the connection of the rake shown on the platform with the link which connects it with the rake portion differs slightly from the connections of the rake shown on the platform at Figs. 1 and 2 of this plan view. Fig. 4 is a vertical section on dotted line $x$, Fig. 3. Fig. 5 is a detail vertical lengthwise central section of the rake-arm connection with the crown-wheel and the parts immediately connected therewith. Fig. 6 is a front elevation of plan Fig. 3. Fig. 7 is a detail plan of the rakes and their connections with the crown-wheel and rake-post, with the rake-arms in the positions of the dotted line $x'$, Fig. 3. Fig. 8 is an under-face view of Fig. 7. Fig. 9 is an isometrical representation of a portion of the rake, showing its connection with the crown-wheel, and of the parts immediately connected therewith.

In the foregoing figures I have only shown such parts of a reaper as are necessary to represent my invention; other parts required to produce a complete reaping-machine may be any of the known devices employed in any of the known forms for like purposes, and hence do not consider it necessary to represent or describe them in this specification.

The main frame of a reaping-machine on which my improved combined rake and reel is mounted is composed of a cutter-bar, A, a platform-supporting beam, B, an end bar, C, and an angular end bar, D, suitably framed and fixed to each other. On this frame the receiving-platform E is supported, all of which is substantially the same as similar parts of some reaping-machines now found in the trade.

F represents a spider of suitable form to serve as a support for the rake-post, and is mounted on the driving-wheel end of the main frame in a suitable position to properly locate the rake.

G is a rake-post, having its lower end firmly fixed in the spider. Its vertical portion, immediately above the spider, forms the journal-bearing on which the crown-wheel revolves.

H is a crown-wheel, having its center provided with a hub centrally bored to receive the vertical lower portion of the rake-post immediately above the spider in such a manner as to revolve thereon.

The under face of the crown-wheel, at its outer edge, is formed with gear-teeth, which engage the teeth of the gear-pinion $a$, mounted on the shaft $b$, fitted to revolve in suitable bearings fixed to the main frame.

The shaft $b$ is designed to be put in working connection with the moving parts of the reaper to impart a rotary motion to the crown-wheel.

The upper face of the crown-wheel is fitted at proper intervals with radial uprising ears $c$ and $c'$, adapted to receive the inner ends of the rake and reel arms. I and I' are rake-heads, substantially such as are found in the trade, and are fitted with teeth $d$, to engage the grain and carry it from the platform. The inner ends of these rake-arms are fitted with joint-sockets $e$, which embrace the under and vertical sides of the arms and are firmly fixed thereto.

The sockets, with the rakes fixed therein, are pivoted to the radial ears $c$ of the crown-wheel in such a manner as to permit a free vertical movement of the rake-heads and hold them radially, so that in the revolutions of the crown-wheel they will be made to sweep the platform. These rake-arms are fitted with adjusting-screws $f$, which are inserted through the joint-socket immediately over the outer-edge portion of the crown-wheel in such a manner that the descent of the rake will be limited by the screw coming in contact with the upper-face surface. These screws furnish the means for adjusting the rake-heads to traverse the platform at the proper level to sweep the cut grain therefrom, which adjustment is accomplished by turning the screw inward to lower the rake, and turning it outward to raise it.

$g$ represents hook portions, which rise from the inner ends of the side flanges of the joint-sockets. $h$ are detents pivoted to the crown-wheel near its center, having their free ends fitted with hooking-arms $i$, adapted to engage the hooks $g$ on the joint-sockets.

J are springs wound about the pivot-journals of the detents, operating to insure their engagement with the hooks $g$. These parts are arranged in such a manner that in the revolutions of the rake, as it descends toward the cutter-bar, the hook-arms of the detents will engage the hooks on the joint-sockets and hold the rake-heads elevated at a proper level to traverse the platform, to operate as a reel-bat, to deposit the grain on the platform as it is cut.

$k$ represents a shouldered stud or pin, fitted to pass loosely through a hole in the crown-wheel provided for its reception immediately under the detent in such a manner that when the stud is pushed up it will lift the detent.

$l$ represents a curved inclined lever pivoted to a projecting portion of the spider F in such a manner as to permit it to swing into the position represented in dotted lines at Fig. 8 and in solid lines at Fig. 5, in which position the depending end of the studs $k$ in the revolutions of the crown-wheel will ascend its upper inclined surface when the rake is approaching the cutter-bar and lift the detent to the position seen in Fig. 5, which will permit the rake to descend to its lowest position to operate as a rake to sweep the cut grain from the platform.

$m$ represents a spring, employed to retain the curved inclined lever in the position seen in solid lines in Fig. 8.

$n$ is a rod, which connects the curved inclined lever to an operating-lever, $o$, pivoted to the machine in a convenient location to be operated by an attendant to swing the curved inclined lever into the position represented in the dotted lines, Fig. 8, to permit the rake to descend to its lowest position to operate as a rake.

The upper portion of the rake-post G is curved, as represented in the drawings, and is inclined toward the forward portion of the platform. Its upper overhanging end, $p$, forms the pivot-center on which the single-link radial connecting-rods revolve, which control the movements of the rake and reel-bats.

To the rake I is fixed an arm, $r$, which projects rearward thereof. Its free end is of eye form, and receives the outer hook-end portion of the single-link radial connecting-rod K in such a manner as to permit it to slide lengthwise therein freely.

$r'$ is a spring, coiled around the outer portion of the connecting-rod, and operates to hold the hook of the rod in contact with the eye. The inner end of the connecting-rod is fitted to receive the overhanging pivot portion of the rake-post, to revolve thereon with the revolutions of the rake. These parts serve to hold the rake and guide it in the track of its pathway, and the rod K, slipping endwise through the eye of the arm, $r$, permits it to traverse the platform in planes substantially parallel thereto, differing only in height, as represented in the solid and dotted lines in Figs. 1 and 5, to operate either as a rake or as a reel-bat, and in either capacity to be held in its lowest position flexibly by the action of the spring $r'$.

In the rake I' some of the devices employed to operate the rake differ slightly from those I have described in connection with the rake I. In this instance $s$ is an arm, of crank form, having its shaft portion supported crosswise of the rake-arm in suitable bearings, in such a manner as to permit its free crank-arm portion to swing in the lengthwise direction of the rake.

$s'$ is a spring, coiled around the shaft portion of the crank-arm in such a manner that its spring action tends to carry the free end of the crank-arm inward toward the center on which the rake revolves. This inward-swinging movement of the crank-arm is limited by a stop, in this instance consisting of a stud or pin fixed to the rake-arm. The upper end of this crank-arm is of eye form, which receives the outer eye-formed end of the radial connecting-rod K', producing a flexible eye-joint connection of the parts. The inner end of the connecting-rod K' is fitted to receive the overhanging pivot portion of the rake-post, to revolve thereon with the revolutions of the rake. The operation of this modification will be substantially the same as that described in connection with the rake I.

L represents reel-arms, which are substantially the same as reel-arms now in common use in this class of reels, and their inner ends are pivoted to the crown-wheel between the ears $c'$, in the usual manner, to permit of a free vertical movement. These reel-arms are supported and guided in the path of their movement by single-link radial connecting-rods M, which connect them with the same overhanging pivot portion $p$ of the rake-post on which the connecting-rods of the rakes revolve.

From the foregoing it will be seen that the rakes and reel-arms of my improved combined rake and reel revolve on two centers which are common to both. This connection of the rakes and reel-arms to centers common to both on which they revolve, cause them in their revolutions to move in a pathway the outline of which is well adapted to gather the grain to the cutters, deposit it on the platform as cut, sweep the cut grain from the platform, and deliver it in gavels, and rise to pass the driver and team in a nearly vertical position without interfering with either.

By the employment of the devices hereinbefore described, and in the manner set forth, I am enabled to dispense with the cams and other expensive parts usually employed in this class of combined reels and rakes, and am enabled to produce a reliable combined rake and reel of few parts, of simple construction, at a small cost, and in which the rakes are capable of use either as a rake or as a reel bat once in each revolution, placed under the control of the attendant, to operate in either capacity, as his judgment may dictate, to deliver the grain in the best manner, and in either capacity the rakes will be held in their lowest position in a flexible manner by spring action in traversing the platform.

I claim as my invention—

1. The combination, with a rake capable of use either as a rake or reel-bat and an eye attached to the rake, of a single link secured at one end to the rake-post, and its opposite end inserted through the eye on the rake, and a spring attached to the link between the rake-post and the eye on the rake, whereby the rake is held in a depressed position by the spring and allowed to rise vertically in opposition to the tension of the spring, substantially as set forth.

2. The combination, with a rake, of a detent adapted to engage with the heel of the rake, a vertically-acting stud for actuating the detent, and a curved inclined lever adapted to be shifted in or out of the line of travel of said stud, substantially as set forth.

3. The combination, with a rake-post and rake-head, of a rake supported by a single link and a spring arranged to force the rake downwardly and to allow the rake to rise throughout any portion of its path of travel, substantially as set forth.

4. The combination, with the single-link connecting-rod carrying a rake, of a spring operating in connection therewith to hold the rake in its lowest position in a flexible manner while traversing the platform either as a rake or as a reel bat, substantially as and for the purpose hereinbefore set forth.

5. The combination, with a rake capable of use either as a rake or as a reel-bat, guided in the path of its movement by a single-link connecting-rod provided with a spring to hold the rake flexibly in its lowest positions, of an adjustable screw-stop between the rake and crown-wheel to limit the descent of the rake, substantially as and for the purpose hereinbefore set forth.

DANIEL L. EMERSON.

Witnesses:
JACOB BEHEL,
A. O. BEHEL.